United States Patent [19]

Reginold

[11] Patent Number: 4,856,613

[45] Date of Patent: Aug. 15, 1989

[54] SAFETY ENGINE LOAD SENSING SYSTEM

[75] Inventor: G. S. Reginold, Coram, N.Y.

[73] Assignee: General Safety Research, Inc., Coram, N.Y.

[21] Appl. No.: 242,035

[22] Filed: Sep. 8, 1988

Related U.S. Application Data

[63] Continuation of Ser. No. 84,402, Aug. 10, 1987, abandoned.

[51] Int. Cl.⁴ .............................................. B60K 28/12
[52] U.S. Cl. ...................................... 180/282; 123/351
[58] Field of Search ....................... 180/273, 283, 282; 123/351; 74/857, 861

[56] References Cited

U.S. PATENT DOCUMENTS

| | | | |
|---|---|---|---|
| 3,154,168 | 10/1964 | Wilmot | 180/283 |
| 3,828,742 | 8/1974 | Weis | 123/351 |
| 4,093,939 | 6/1978 | Mitchell | 180/282 |
| 4,294,327 | 10/1981 | Howard | 180/273 |
| 4,459,806 | 7/1984 | Falk | 74/857 |
| 4,491,112 | 1/1985 | Kanegae et al. | 123/351 |
| 4,583,171 | 4/1986 | Hara et al. | 74/861 |

Primary Examiner—Charles A. Marmor
Assistant Examiner—Ross Weaver
Attorney, Agent, or Firm—Leonard Belkin

[57] ABSTRACT

Method and apparatus for disabling an automobile powered by an engine utilizing an automatic transmission with a gear selector movable between non-drive and drive positions. After the engine is started up with the gear selector in a non-drive position, the movement of the latter into a drive position initiates a timer to deliver a signal for a predetermined period of time such as 15 seconds. That signal is employed to disable the engine within the vehicle if during that period an acceleration or throttle measuring device indicates that excessive acceleration is occurring or that a seat sensor device indicates that the driver is not present. Acceleration is measured by sensing intake manifold pressure or throttle position.

18 Claims, 3 Drawing Sheets

SAFETY ENGINE LOAD SENSING SYSTEM

This application is a continuation of my application Ser. No. 084,402 filed on Aug. 10, 1987, now abandoned.

BACKGROUND OF THE INVENTION

The present invention relates to a safety engine load sensing system and more particularly to a system for use with gasoline powered, automatic transmission equipped vehicles for responding to unexpected load or acceleration of the engine and certain other potentially hazardous situations. During recent years there has been a spate of disturbing reports of vehicles going out of control as a result of the unexpected acceleration of the engine and causing injury to persons and damage to the vehicle and other property.

This particular problem does not appear to be limited to one make or model of automobile. In fact, while certain specific automobiles have received much of the notoriety associated with this problem, the fact appears to be that no modern gasoline powered vehicle equipped with an automatic transmission is totally immune to the problem.

The manufacturers of automobiles faced with this problem have apparently not been able conclusively to identify the cause of the difficulty. One common theory, but by no means the only one, is that the operator is at fault, perhaps stepping down on the accelerator pedal believing it to be the brake pedal. As a result, efforts to deal with it have been largely limited to the addition or modification of a linkage or mechanism to avoid the error just mentioned. However, even with the installation of safety devices the problem continues to exist and manufacturers of the automobiles appear to be stymied as to how to tackle the problem.

In U.S. Pat. Nos. 4,294,327 and 4,369,745 to Howard are shown safety devices primarily for use with riding lawn mowers to disable the engine in the event either the tractor transmission or the power takeoff is engaged, and prevent continued operation if either the transmission or power takeoff is engaged and the operator falls from or otherwise leaves the seat. The teachings of these patents are not applicable to the problem of unexpected acceleration in vehicles of the type to which this invention pertains.

SUMMARY OF THE INVENTION

In the apparatus and method of this invention, according to a preferred embodiment, excessive load or acceleration of the engine is sensed during a predetermined length of time after the gear selector is moved into a drive gear, such as forward or reverse following the start of the engine in park or neutral. Under current design configurations commonly in use, the automobile is provided already with an interlock preventing starting of the engine in other than a non-drive position of the gear selector lever. Once the excessive load or acceleration is detected during the aforementioned time interval, the ignition system is grounded thereby disabling the engine. Other ways of interfering with the ignition are possible, but grounding is preferred to overcome the possibility that feedback from defective relays or accessories, or from active (running) permanent magnet motors may provide enough electrical power to the ignition system to prevent proper disablement by other means. Additional other features of the invention which may be included will be described below.

In accordance with one preferred embodiment of this invention there is provided in a spark ignition engine powered vehicle equipped with an automatic transmission which includes a gear selector movable between non-drive and drive positions, a sensor for measuring acceleration or load of the engine, and apparatus responsive to movement of the gear selector from a non-drive position to a drive position for terminating ignition of the engine when acceleration or load of the engine exceeds a predetermined value during a predetermined period of time after the selector is moved into the drive position.

Other embodiments of the invention include the method of disabling an engine in a vehicle when an unintended excessive acceleration occurs within a predetermined period after the gear selector is moved into a drive position.

Additional features of the invention, to be more particularly described below, include provision for disabling the engine under other anticipated dangerous situations.

It is therefore a principal object of this invention to provide method and apparatus for disabling an engine in a vehicle under certain prescribed conditions.

Other objects as well as advantages of this invention will become obvious from the following description of preferred embodiments of this invention.

DETAILED DESCRIPTION OF THE PREFERRED EMBODIMENTS

Figure 1:
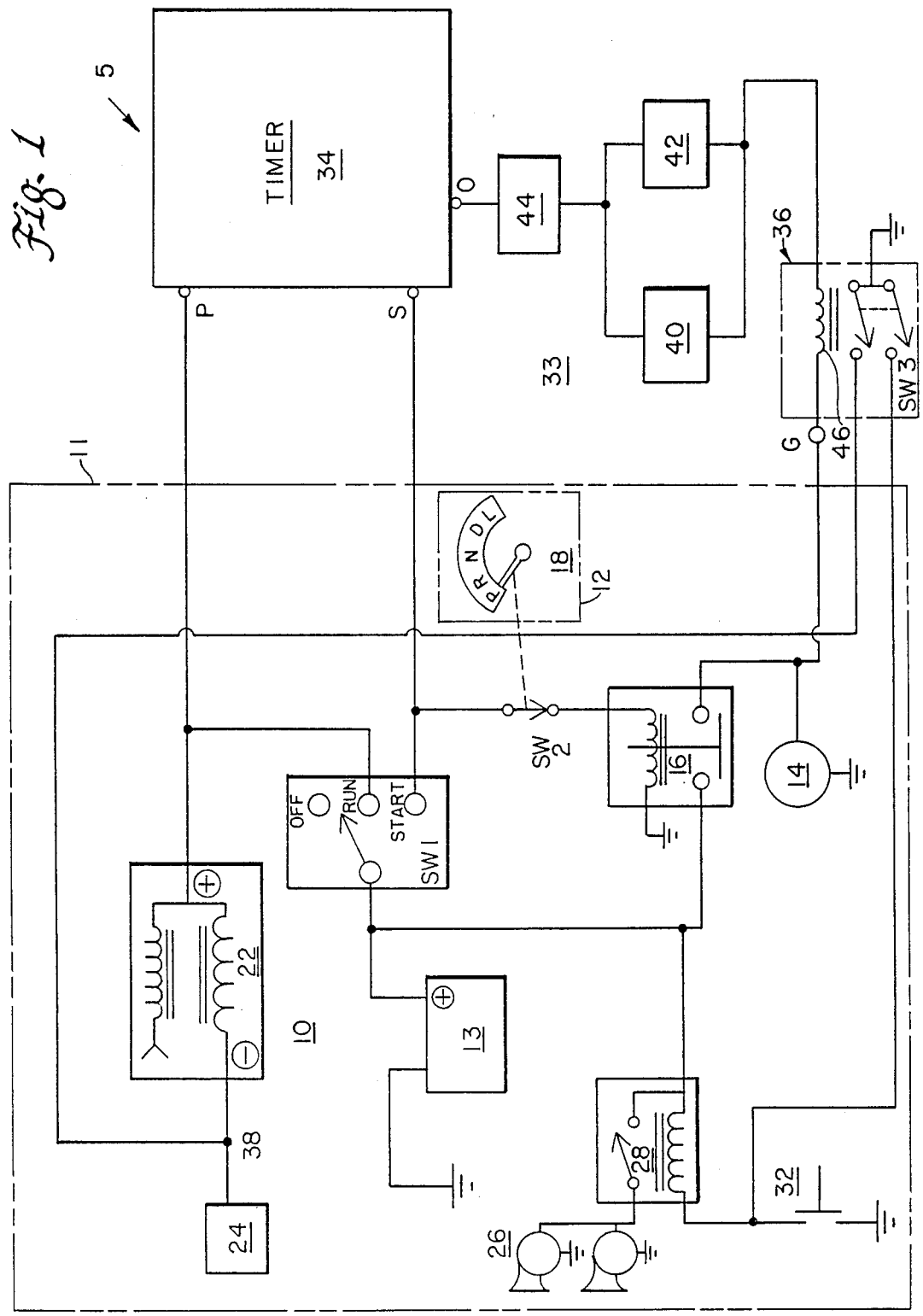
FIG. 1 is a block diagram showing schematically a preferred embodiment of this invention.

Referring to FIG. 1, there is illustrated within a vehicle 5, a typical ignition system 10 for a throttle operated internal combustion engine 11 powering said vehicle 5 equipped with an automatic transmission 12 incorporating the principles of this invention. Ignition switch SW1 has the usual OFF, RUN, and START positions. The accessory position, for operating the radio and other accessories while the engine is not running, is not shown in order not to complicate the schematic.

Connected to ignition switch SW1 in usual fashion is battery 13. In the START position of ignition switch SW1, starter motor 14 is energized through starter relay 16 and neutral safety switch SW2. Switch SW2 is standard on virtually all vehicles of the type herein described with automatic transmission. It is linked directly to gear selector 18 which is a part of the automatic transmission. When selector 18 is in a non-drive position (i.e., park, neutral) then switch SW2 is closed so that starter relay 16 can be energized (that is, the engine can be started). When selector 18 is in a drive position (i.e., drive, reverse, etc.) then switch SW2 is in its open position and the engine can not be started.

It should be noted that neutral safety switch SW2 is shown connected between the start position of switch SW1 and starter relay 16. This arrangement is typical of many automobiles in use. Other common configurations include connecting the neutral safety switch between the starter relay and ground, where the starter relay can either be connected to the start position of ignition switch SW1 directly or indirectly. The present invention, as shown, will operate effectively in any arrangement of the neutral safety switch which is in use, when connection to engine 11 provides that terminal G (ground for relay 36 and 98 in FIG. 4 to be described) and terminal S have the same voltage potential during starter operation, rendering the device inoperative while starting.

Returning to FIG. 1, in the RUN position of ignition switch SW1, ignition coil 22, connected to the electronic ignitor or breaker points 24 still in use some automobiles, is energized. It is understood that unit 24 which provides the actual ignition is part of the engine.

The schematic in FIG. 1 also shows, for reasons which will be evident later, the circuit for horn 26 consisting of horn relay 28 and horn button 32 (which is actuated by the driver and is usually located on the steering wheel).

In accordance with a preferred embodiment of this invention, there is provided a safety circuit 33 comprising a timer 34 connected to a relay 36 through circuitry to be described. Timer 34 is connected as illustrated across the RUN and START positions of ignition switch SW1 through terminals P and S, respectively. Timer 34 receives its power through terminal P (hence, only when switch SW1 is in the RUN position) but is triggered at terminal S when neutral safety switch SW2 is opened and ungrounds timer 34 causing the latter to begin operation, which as noted earlier, occurs when selector 18 is moved into a drive position. Timer 34, once triggered, remains actuated for a predetermined period of time, typically 15 seconds. During its period of actuation, timer 34 produces a signal on its output terminal O which if delivered to relay 36 would ground ignition system 10 at 38 and activate horn relay 28. It is understood that 15 seconds is given by way of example and the invention contemplates that some other value of time may be used if desired.

Relay 36 consists of a coil 46 and a double throw switch SW3 connected as shown to sound the horn and to ground the ignition system. This would result in engine 11 becoming disabled since it would lack ignition, and horn 26 would be sounded which would indicate to the driver and passers-by what has occurred. It is understood that the disabling system would function without the connection to sound the horn. Also, the electrical connection from relay 36 to horn button 32 is shown schematically. As understood in the art, horn circuit may be actuated by a relay or any other means known in the art.

In order to prevent engine 11 from being disabled during the period that timer 34 is producing a signal on output terminal O, there is provided between terminal O on timer 34 and relay 36 a load sensor 40 and a seat sensor 42 in parallel with each other and an upshift circuit 44 in series with the former. Load sensor 40 is a device which directly measures the acceleration or load of the engine and/or position of the throttle, and in the event the acceleration or load exceeds a predetermined value it then closes the circuit between terminal O on timer 34 and relay 36. Seat sensor 42 would consist of a normally closed switch in the driver's seat so that if selector lever 18 is moved or slides into a drive position while the seat is unoccupied, this sensor would also, close the circuit to relay 36 resulting in disablement of engine 11.

Upshift switch circuit 44 is a normally closed switch which would be open when the transmission upshifts into second gear thereby blocking the signal to relay 36. It has been found that virtually all occurrences of unintended acceleration occur almost immediately after selecting a drive range, therefore, if the vehicle has been driven long enough to cause an automatic gear change into second gear, it is, by analysis, out of danger of unintended acceleration.

Hence, under normal operating conditions, with the driver occupying the driving seat (keeping switch circuit 42 open) and switch circuit 44 in its normally closed position, engine 11 will be disabled only if sensor 40 detects an unacceptable level of acceleration or load during the period timer 34 is running. It is apparent, also, that the safety circuit 33 just described can be operated without circuits 42 and 44 being used, if desired.

Once timer 34 ceases to produce its output signal on terminal O after its timing period which may, as noted above, be 15 seconds, then safety circuit 33 is out of the picture and does not affect the operation of engine 11. In the event that neutral safety switch SW2 is closed by operating gear selector 18 moving into or past a non drive range, such as when maneuvering into a parking space or garage, timer 34 resets, and functions as described above.

Figure 2:
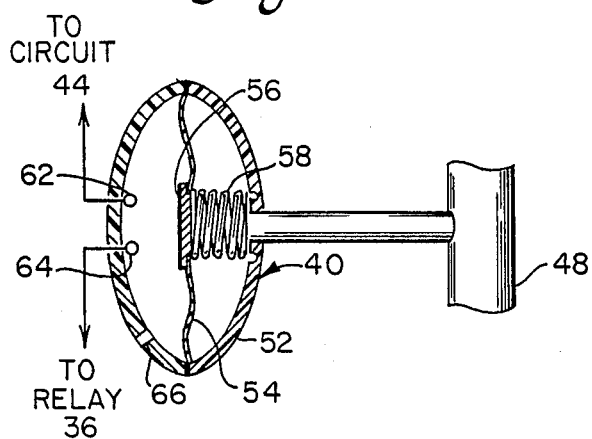
FIG. 2 shows details of a load sensor which may be employed in the system illustrated in FIG. 1.

As seen in FIG. 2, sensor 40 may be a device that measures the vacuum within intake manifold 48 of the engine. Sensor 40 consists of a housing 52 divided into separate chambers by a flexible diaphragm 54 having a conductive disc 56 mounted thereon. A spring 58 biases diaphragm 54 to the left so that disc 56 completes an electrical connection between a pair of contacts 62 and 64 which completes the circuit between upshift switch circuit 44 and relay 36. The vacuum in manifold 48 maintains diaphragm 54 in a position as shown because the space within housing 52 to the left of diaphragm 54 is at ambient pressure due to a vent 66. The tension of spring 58 is such that when the vacuum within manifold 48 declines (approaches atmospheric pressure) to some predetermined value, disc 56 will close the circuit across contacts 62 and 64. Excessive acceleration or load of the engine is defined in accordance with the principles of this invention as when vacuum in the intake manifold declines to some predetermined value, for example, 3" Hg. In other words, vacuum in excess of 3" Hg. during that initial period set by timer 34 would be considered normal and not excessive. It is understood that 3" Hg. is given by way of example and this invention contemplates that some other value of suction may be used in determining whether there is excessive acceleration. The spring value of spring 58 determines at what level of vacuum disc 56 closes the gap between contacts 62 and 64.

Since excessive throttle opening may be insufficient to overcome spring 58 during starting, sensor circuit 40 may be closed. Therefore it will be seen in FIG. 1 that, in vehicles in which neutral safety switch SW2 is connected directly to the START terminal of ignition switch SW1, ground terminal G for relay 36 is shown connected to the output of starter relay 16 to prevent operation of relay 36 under this condition. Other possible variations of connections include connecting terminal P to the accessory terminal of SW1 which is not powered during starting.

It is understood that other ways of determining excessive acceleration of the automobile may be employed. For example, it could be measured by a direct connection of a mechanical or mercury type switch to the throttle linkage or fuel injection system, or even by employing an inertial device mounted elsewhere in the vehicle.

Referring back to FIG. 1, it will be recalled that seat sensor 42 is in parallel with load sensor 40. The former is merely a switch circuit which is closed when the driver seat is unoccupied. Thus, if the engine is running and the gear select lever 18 is in park or neutral with the driver absent, in the event that lever 18 slides into a drive position, circuit 42 will disable the engine regardless of whether or not there is an excessive acceleration condition. It has already been noted, however, also, that the system as described will function without circuit 42 present, and that in fact the safety system will function with seat sensor 42 and without load sensor 40 and circuit 44 solely to prevent movement of the vehicle in absence of the driver during the period timer 34 is in operation.

Figure 3:
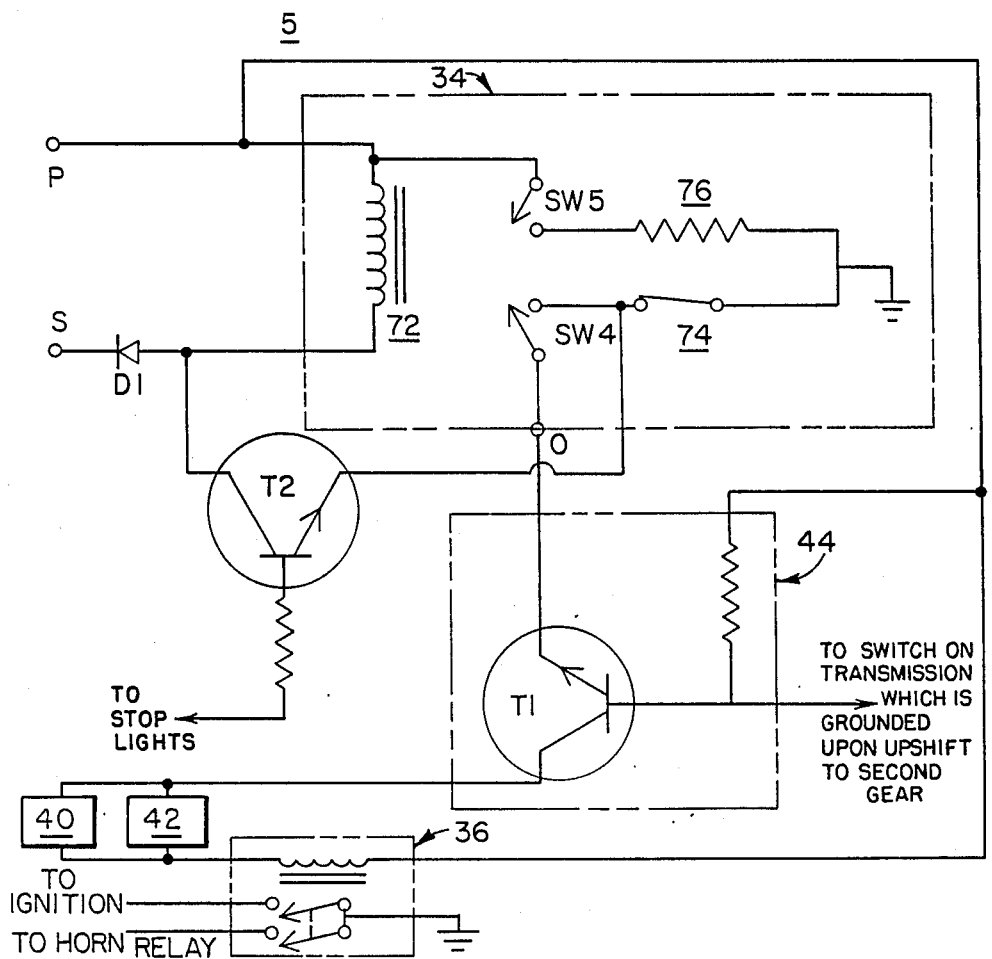
FIG. 3 shows details of the safety circuit employed in the arrangement of FIG. 1.

For details of a timer 34 which can be employed and upshift switch circuit 44 reference is made to FIG. 3. Timer 34 consists of a relay 72 whose coil is connected across terminals P and S. The normal state of relay 72 when not energized is closed, that is, switches SW4 and SW5 are closed. These switches are shown in their open position which is the case when neutral safety switch SW2 is closed and relay 72 is powered, holding switches SW4 and SW5 open as shown.

Switch SW4 is connected on one side to output terminal O while its other side is connected through a bimetallic element 74 to ground. Switch SW5 is connected between power terminal P and through a heater 76 to ground. When relay 72 is deenergized permitting switches SW4 and SW5 to close, heating element 76 heats up bimetallic element 74 which opens the circuit after the predetermined period of time (i.e., 15 seconds as noted above) it takes to actuate bimetallic element 74. During that predetermined period of time there is a completed circuit within timer 34 from terminal O to ground with the result that there is present a signal at terminal O. Once bimetallic element 74 is heated to a sufficient temperature the circuit is opened, and remains so due to the continued heating by heater 76 and there is no longer a signal on terminal O, in effect taking safety circuit 33 out of operation.

Figure 3A:
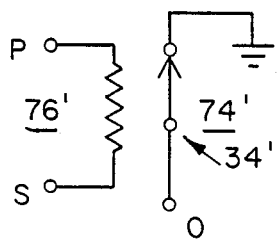
FIG. 3a shows an alternative embodiment of the timer shown in FIG. 3.

A simpler version of the timer 34 is shown in FIG. 3a. Timer 34' consists of a bimetallic switch 74' which is normally open until heated by heater 76' which is connected across the P and S terminals. Grounding contact S causes heater 76' to heat up bimetallic switch 74' causing a completed circuit from terminal O to ground. Ungrounding terminal S causes bimetallic switch 74' to slowly cool, relaxing its pressure on the contacts and eventually moving far enough to open the circuit to terminal O.

Also shown in FIG. 3 are the upshift circuit switch 44 in which transistor T1 is rendered non-conductive during the time its base is grounded when the transmission is upshifted to second gear, as illustrated.

A transistor T2 may be provided if desired to delay the operation of timer 34 in the event that the driver has a foot on the brake pedal when the shift lever is moved into a drive position. Transistor T2 bypasses relay 72 keeping the latter energized when the stop lights are on. When the brake pedal is released, then timer 34 will begin its timing sequence as previously described.

An isolation diode D1 is placed in series with the connection from neutral safety switch SW2 to prevent a complete circuit through transistor T2 to ground when the brake is applied which would allow certain vehicles to be started in a drive range under certain conditions should ignition switch SW1 be turned to start.

In the operation of the system described, the operator of the vehicle starts the engine with the gear selector in the park or neutral position of the automatic transmission. Neutral safety switch SW2 is closed and relay 72 in timer 34 is energized and switches SW4 and SW5 are open as seen in FIG. 2. When selector 18 is moved into a drive position, switch SW2 opens thereby deenergizing relay 72 causing switches SW4 and SW5 to close, completing the circuit from relay 36 to switch SW4 in timer 34 through upshift circuit 44 (assuming it is closed) except for load sensor 40 and seat sensor 42 which are normally open as described above. If sensor 40 detects excessive load upon the engine causing disc 56 to close contacts 62 and 64 as seen in FIG. 2 before bimetallic element 74 opens, or if the driver is absent from the seat and the switch in circuit 42 is closed, then relay 36 is energized and the ignition system is grounded at 38 as seen in FIG. 1 and the engine is disabled. However, in the event that bimetallic element 74 heats up and opens the circuit before any excessive acceleration is detected in housing 52, then the closing of contacts 62 and 64 by disc 56 would have no affect on the operation of the engine.

Once the vehicle has been in operation past the critical period set by timer 34 then there is no restriction imposed by this invention on the acceleration of the vehicle. Hence, the driver is free to operate the vehicle in a normal manner, passing at high speed when required, for example.

Safety circuit 33 described above is an electromechanical arrangement which can either be incorporated as part of the original equipment in the vehicle or can be added on to a vehicle in use.

It is readily apparent that this invention is not limited to the particular construction of safety circuit 33 shown in FIGS. 1–3a.

Figure 4:
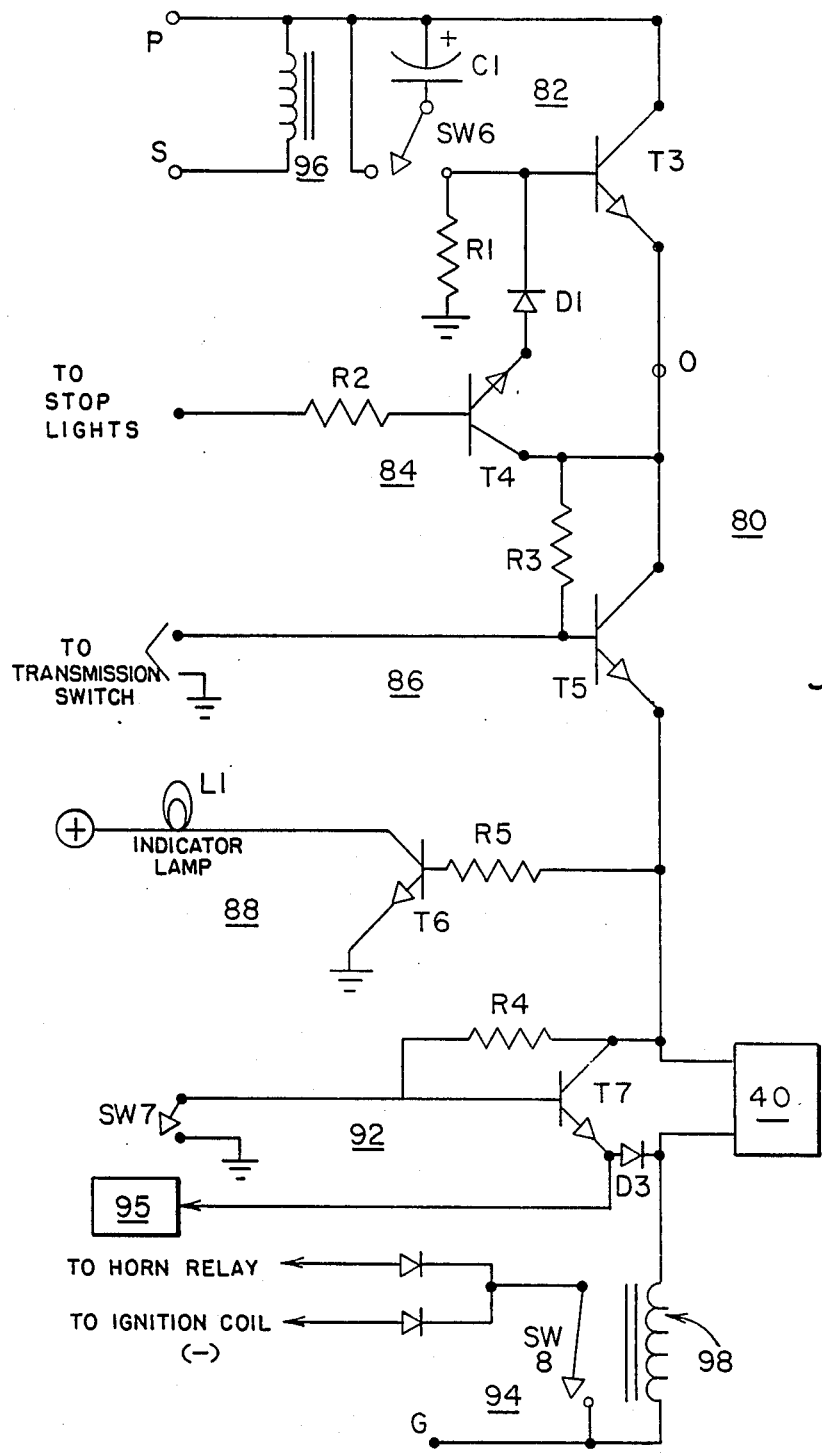
FIG. 4 shows an alternative embodiment of the safety circuit shown in FIG. 3.

If desired, an arrangement which is more heavily electronic in configuration can be employed. Such an arrangement is shown in FIG. 4 where a safety circuit 80 is illustrated for use instead of the safety circuit 33 in the arrangement shown in FIG. 1.

Safety circuit 80, which is identical to safety circuit 33 in FIG. 1 except that the latter does not show the lamp indicator circuit 88 described below, consists of a timer 82, a brake delay circuit 84, an upshift circuit 86, a lamp indicator circuit 88, a seat sensor circuit 92 in parallel with load sensor 52, and ignition killer circuit 94 for grounding the ignition system of the engine and sounding the horn.

A diode D3 may be installed to isolate the output of seat sensor circuit 92 so that if killer circuit 94 is energized by seat sensor circuit 92, power from transistor T7 may be used to activate an electrically triggered device 95 which is capable of applying the vehicle's service or parking brake or a retrofit drive shaft or wheel brake to arrest vehicle motion.

Timer 82 consists of a relay 96 connected across terminals P and S and the relay switch SW6 is connected through an electrolytic capacitor C1 to power supply terminal P. Switch SW6 shorts out capacitor C1 (that is, maintains it in a discharged state) when relay 96 is energized and its other contact are connected to the base of a transistor T3. The emitter of transistor T3 is connected to the collector of transistor T4 in brake delay circuit 84, the base of which is connected to the stop lights through a resistor R2 to prolong timer operation if the brakes are applied when the gear selector is moved into a drive position. The emitter of transistor T4 is connected to the base of transistor T3 through a diode D1. Upshift circuit 86 consists of a transistor T5 whose collector is connected to the collector of transistor T4 and the emitter of transistor T3. The base of transistor T5 goes to the transmission for grounding to block timer output when the transmission is upshifted as previously described.

Lamp indicator circuit 88 consists of a transistor T6 which will complete the circuit for indicator light L1 when there is current flow to load sensor 52 and seat sensor 92, which if closed, would activate killer circuit 94. In addition, an air conditioning cutout (not shown) curcuit may be employed if desired and connected directly across the indicator lamp to remove the additional load imposed upon the engine during the critical period in which total engine load is being sensed.

Seat sensor circuit 92 consists of a transistor T7 connected to driver seat switch SW7 which is closed in this arrangement grounding the base of transistor T7 when the driver seat is occupied, allowing normal operation. SW7 is opened when the driver is absent, permitting its transistor T7 to conduct and pass a signal to killer circuit 94. Load sensor 52 in parallel with seat sensor 92 is the same as the load sensor previously described.

Circuit 84 prevents capacitor C1 from charging due to the loop created through transistor T4 from terminal O to C1(−), effectively preventing timer countdown until the brake is released Ignition killer circuit 94 consists of a relay 98 with a switch SW8 which will close when the coil is energized to ground the ignition at 38 (see FIG. 1) and activate the horn (see FIG. 1). Output diodes are shown as an alternative to using separate contacts on relay 98, such as those seen in FIG. 3 on relay 36.

In operation of safety circuit 80, when the gear selector is in P or N, contact S remains grounded with relay 96 energized, with capacitor C1 shorted and discharged. When the gear select lever is moved into a drive position, contact S is ungrounded, relay 96 is deenergized, and switch SW6 makes contact with the base of transistor T3. Capacitor C1 starts to charge and transistor T3 begins to conduct so that there is an output signal on terminal O. The voltage on the base of transistor T3 drops away from the positive battery voltage as the charge on capacitor C1 increases until after a period of time transistor T3 will cease to conduct and there will no longer be sufficient output on contact 0 to be passed down to ignition killer circuit 94 provided switch circuits 86, and 92 or 52 are closed, as previously described. The use of a resistor R1 as shown may be employed to alter the length of time it takes for capacitor C1 to become charged and terminate conduction of transistor T3. As noted earlier, in the event that there is power to the stop lights that is, the brake is applied when the shift lever is moved into a drive position, this will prevent the charging of capacitor C1 with the result that timer operation will not begin until the brake is released.

It will be noted from the above description of this invention that it makes no difference what causes the excessive acceleration As a result, an important advantage of this invention is that it is irrelevant whether the excessive acceleration is caused by a defect in the operating system of the vehicle or driver error as some people in the industry claim.

Another advantage of this invention is that it can be employed with existing vehicles in operation with minimum cost as an add on as well as being incorporated as original equipment. Still another advantage is that it is capable of being used with any manufacturer regardless of the type of fuel system or ignition system or starting system being employed.

While only certain preferred embodiments of this invention have been described it is understood that many variations are possible without departing from the principles of this invention as defined in the claims which follow. For example, the particular configuration illustrated in FIG. 1 is typical of the kind of ignition and starting systems employed by many automobile manufacturers. However, other manufacturers utilize arrangements which differ in detail because of such factors as the employmment of opposite polarity of the system, the neutral safety switch being located in another part of the system, etc. It is therefore understood that the present invention can be modified to meet the requirements of any particular configuration to carry out and be in conformance with the principles of this invention.

What is claimed is:

1. In a fuel burning engine powered vehicle equipped with an automatic transmission which includes a gear selector movable between non-drive and drive positions, the combination comprising means for measuring the vehicle load on said engine, timer means for initiating the production of a signal when said gear selector is moved into said drive position and terminating said signal after a predetermined length of time, engine killer means responsive to said signal for disabling said engine, means for blocking the delivery of said signal to said killer means, and means responsive to a predetermined vehicle load on said engine as measured by said measuring means for unblocking said blocking means thereby passing said signal to said engine killer means to disable said engine.

2. The apparatus of claim 1 having means for passing said signal when said gear selector is moved into a drive position and the driver seat of said vehicle is unoccupied.

3. The apparatus of claim 1 having means to block said signal when said transmission is upshifted.

4. The apparatus of claim 1 including means to send an audible alarm upon energization of said engine killer means.

5. The apparatus of claim 1 in which said engine has spark ignition and said engine killer means causes grounding of the ignition for disabling said engine.

6. The apparatus of claim 5 having timing means to generate a signal for a predetermined length of time when said gear selector is moved into a drive position, actuating means upon energization to interrupt said spark delivery and means responsive to excessive load on said engine for delivering said timing signal to said actuating means for energizing the latter 7. The apparatus of claim 6 having means to block the delivery of said timing signal under a predetermined set of other conditions.

8. The method of disabling an engine in a vehicle having an automatic transmission which includes a gear selector movable between non-drive and drive positions and killer means responsive to a signal to disable said engine, comprising the steps of measuring the load on the engine, producing said signal during a predetermined period of time after said gear selector is moved from a non-drive to a drive position, normally blocking delivery of said signal to said killer means, and unblocking delivery of said signal when said vehicle reaches a predetermined level of acceleration, thereby effectively terminating propulsion of said vehicle.

9. The method of claim 8 in which said engine has spark ignition and disabling of said engine is caused by interruption of spark delivery.

10. The method of claim 8 in which an audible signal is produced when said termination means is energized.

11. The method of claim 8 wherein engine load is measured from the intake manifold or throttle linkage of said engine.

12. In a fuel burning engine powered vehicle equipped with an automatic transmission which includes a gear selector movable between non-drive and drive positions, the combination comprising means for measuring load on said engine, engine killer means responsive to movement of said gear selector from a non-drive position to a drive position for disabling said engine when the load on said engine exceeds a predetermined value during a predetermined period of time after said selector is moved into a drive position, timer means for initiating the production of a signal when said gear selector is moved into said drive position and terminates said signal after a predetermined length of time, means responsive to excessive load on said engine as measured by said measuring means for passing said signal to said engine killer means for disabling said engine, and means to prolong actuation of said timer means when the brakes of said vehicle are applied at the time said timer means is producing said signal.

13. The apparatus of claim 1 in which said predetermined load is a predetermined acceleration of said vehicle.

14. The method of disabling an engine in a vehicle having an automatic transmission which includes a gear selector movable between non-drive and drive positions, said vehicle including means for causing termination of engine operation, comprising the steps of measuring the load on said engine, and terminating operation of said engine when the load on said engine is excessive during a predetermined period of time after said gear selector is moved from a non-drive to a drive position, wherein a signal is produced for a predetermined period of time after the gear selector is moved into a drive position, and said signal is delivered to cause energization of said termination means when said excessive load is measured, and wherein braking of said vehicle where said signal is being produced prolongs delivery of said signal until said braking is terminated.

15. In a fuel burning engine powered vehicle equipped with an automatic transmission which includes a gear selector movable between non-drive and drive positions, the combination comprising means for measuring the vehicle acceleration load on said engine, timer means for initiating the production of a signal when said gear selector is moved into said drive position and terminating said signal after a predetermined length of time, killer means responsive to said signal for reducing acceleration of said vehicle, means for blocking the delivery of said signal to said killer means, and means responsive to a predetermined vehicle load on said engine as measured by said measuring means for unblocking said blocking means thereby passing said signal to said killer means to reduce the acceleration of said vehicle.

16. In fuel burning engine powered vehicle equipped with an automatic transmission which includes a gear selector movable between non-drive and drive positions, the combination comprising means for measuring vehicle acceleration load on said engine, killer means responsive to movement of said gear selector from a non-drive position to a drive position for reducing the acceleration of said vehicle when the load on said engine exceeds a predetermined value during a predetermined period of time after said selector is moved into a drive position, timer means for initiating the production of a signal when said gear selector is moved into said drive position and terminates said signal after a predetermined length of time, means responsive to excessive vehicle acceleration load on said engine as measured by said measuring means for passing said signal to said killer means for reducing said acceleration, and means to prolong actuation of said timer means when the brakes of said vehicle are applied at the time said timer means is producing said signal.

17. The method of disrupting the forward propulsion of a vehicle with an engine and an automatic transmission which includes a gear selector movable between non-drive and drive positions and killer means responsive to a signal to cause said disrupting, comprising the steps of measuring the vehicle acceleration load on said engine, producing said signal during a predetermined period of time after said gear selector is moved from a non-drive to a drive position, normally blocking delivery of said signal to said killer means, and unblocking delivery of said signal when said vehicle reaches a predetermined level of acceleration, thereby effectively disrupting propulsion of said vehicle.

18. The method of disrupting the forward propulsion of a vehicle with an engine and having an automatic transmission which includes a gear selector movable between non-drive and drive positions, said vehicle including means for causing the disrupting, comprising the steps of measuring the vehicle acceleration load on said engine, and disrupting the forward propulsion of said vehicle when the load on said engine is excessive during a predetermined period of time after said gear selector is moved from a non-drive to a drive position, wherein a signal is produced for a predetermined period of time after the gear selector is moved into a drive position, and said signal is delivered to cause energization of the disrupting means when said excessive load is measured, and wherein braking of said vehicle when said signal is being produced prolongs delivery of said signal until said braking is terminated.

* * * * *